July 17, 1962 J. R. HARKNESS 3,044,238
ENGINE POWERED ROTARY LAWN MOWER WITH IMPROVED ENGINE STARTER
Original Filed March 31, 1958 5 Sheets-Sheet 1
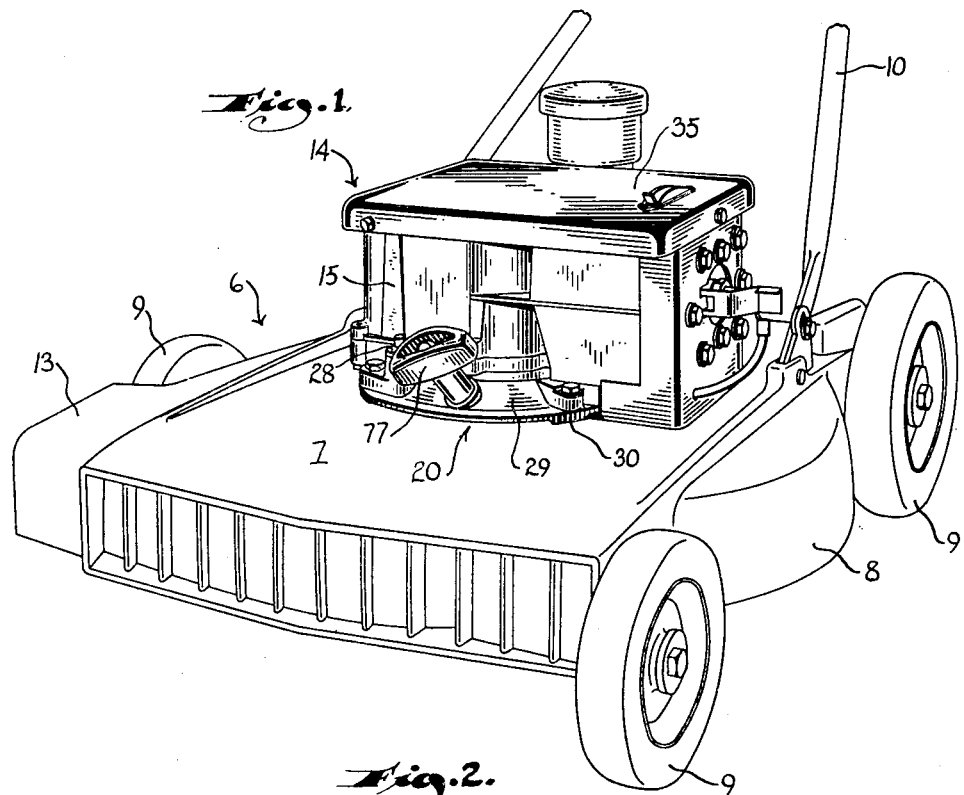
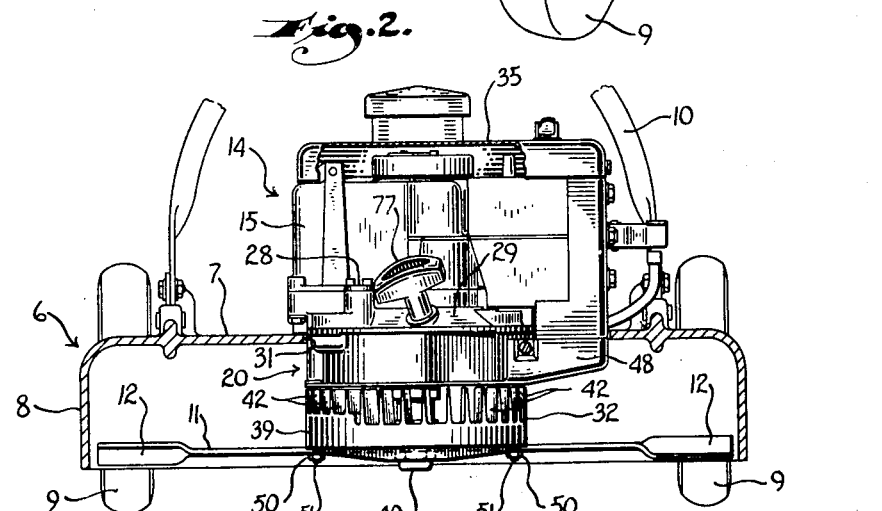
Inventor
Joseph R. Harkness July 17, 1962     J. R. HARKNESS     3,044,238
ENGINE POWERED ROTARY LAWN MOWER WITH IMPROVED ENGINE STARTER
Original Filed March 31, 1958     5 Sheets-Sheet 2

Inventor
Joseph R. Harkness

July 17, 1962     J. R. HARKNESS     3,044,238
ENGINE POWERED ROTARY LAWN MOWER WITH IMPROVED ENGINE STARTER
Original Filed March 31, 1958     5 Sheets-Sheet 3

Inventor
Joseph R. Harkness

Inventor
Joseph R. Harkness

Inventor
Joseph R. Harkness

United States Patent Office 3,044,238
Patented July 17, 1962

3,044,238
ENGINE POWERED ROTARY LAWN MOWER
WITH IMPROVED ENGINE STARTER
Joseph R. Harkness, Milwaukee, Wis., assignor to Briggs
& Stratton Corporation, Milwaukee, Wis., a corporation of Delaware
Continuation of application Ser. No. 109,209, May 10, 1961, which is a division of application Ser. No. 725,130, Mar. 31, 1958. This application Oct. 9, 1961, Ser. No. 144,286
10 Claims. (Cl. 56—25.4)

This invention relates to subject matter disclosed in my application Serial No. 725,130, now abandoned, filed March 31, 1958, and in my later application Serial No. 109,209, now abandoned, filed May 10, 1961, as a division of said earlier application, and of which divisional application this application is a continuation.

The invention of this application, like that of my application Serial No. 109,209, of which this is a continuation, concerns itself with the problem of starting the engines of rotary power lawn mowers. The engines are customarily mounted upon the deck of the mower chassis with the crankshaft of the engine vertical and projecting down through a hole in the deck to mount the cutter blade of the mower. The primary purpose of the invention is to provide an engine-powered rotary lawn mower having the starter mechanism for the engine so placed and oriented that the point at which engine-starting torque is applied to the crankshaft of the engine is below the mower deck, to thus eliminate—or at least greatly minimize—the likelihood of tipping the mower during the starting of the engine.

Engines of the type with which this invention is concerned, are equipped with a mounting flange which seats upon the deck of the lawn mower or other implement with which the engine is used. The crankshaft projects vertically down from the bottom of the engine below this mounting flange and, in the case of a rotary lawn mower, has the cutter blade mounted thereon. For the mower to function properly, a definite minimum spacing must be maintained between the cutter blade and the underside of the mower deck, and heretofore the only part of the engine located in this space was the downwardly projecting end portion of the crankshaft to which the mower cutter blade was secured.

In the instant invention, however, this space contains the flywheel, the air impeller, the magneto, and the starter mechanism. Not only does this assure greater stability for the mower during starting of the engine, but, in addition, it allows the industrial designer greater freedom in his choice of design for the mower, since the engine has a lower silhouette and can be entirely enclosed or covered.

An especially advantageous feature of the present invention resides in the novel manner in which the starter mechanism and the lower cover casting of the engine crankcase are coordinated and combined to house the starter mechanism and provide a rope guiding passage which opens to the top of the mounting flange and hence to the top side of the mower deck. This enables the pull to be applied to the starting rope in an upward direction rather than in a more or less horizontal direction, which is obviously easier.

Still another feature of the invention resides in the manner in which the starter mechanism of the engine and the flywheel coact in the transmission of starting torque to the engine.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention, constructed according to the best mode so far devised for the practical application of the principles thereof, and in which:

FIGURE 1 is a perspective view of an engine-powered lawn mower of the rotary type, embodying this invention;

FIGURE 2 is a vertical cross sectional view through the mower taken on a plane substantially directly forward of the engine;

Figure 6:
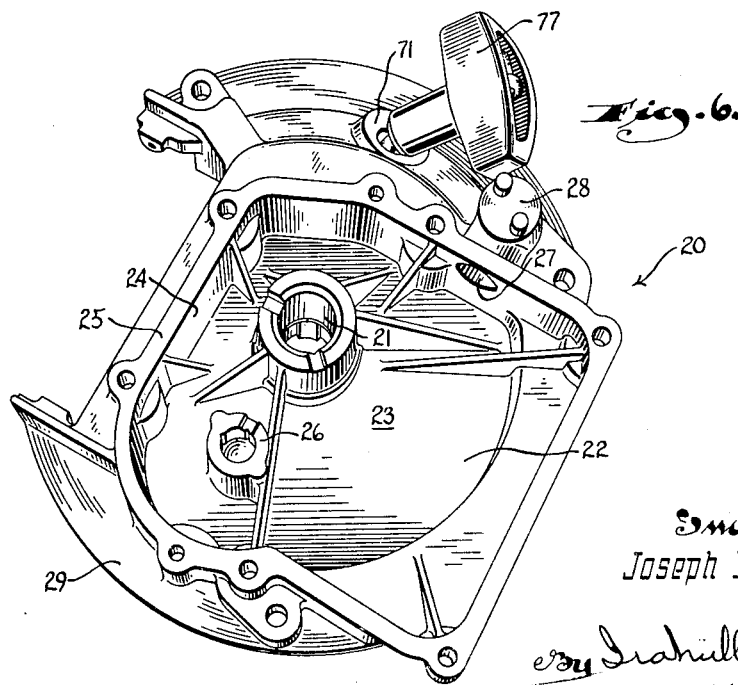
Figure 7:
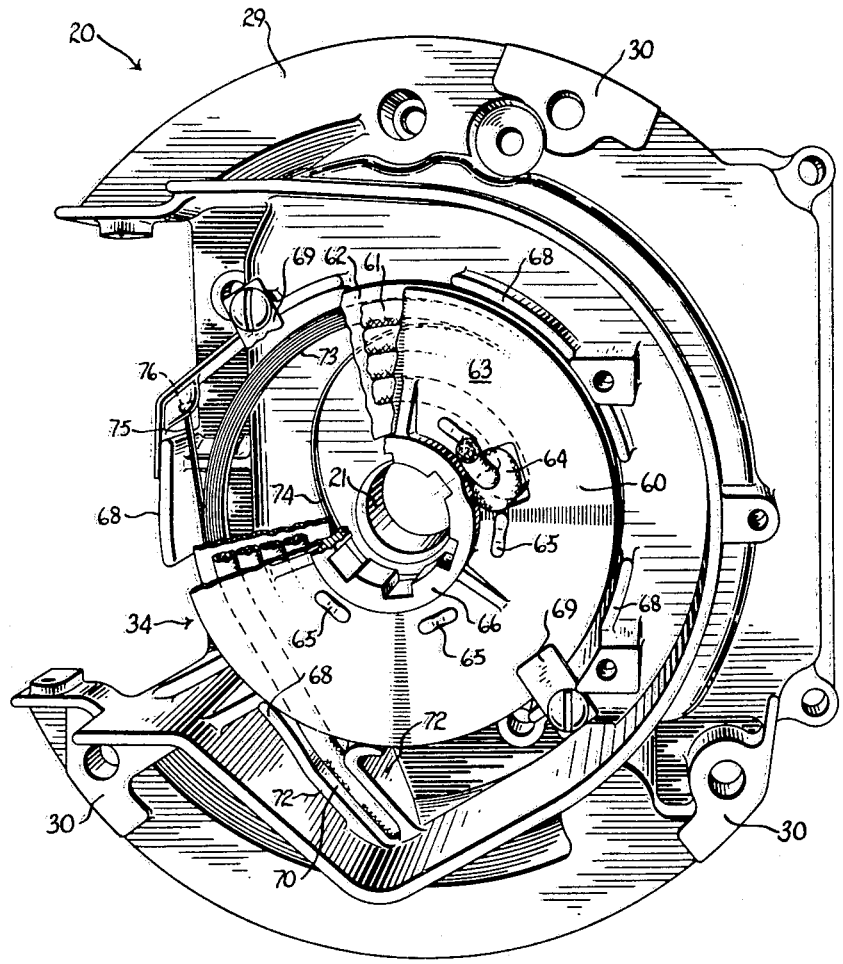

FIGURE 6 is a perspective view of the top side of the casting which serves as the cover for the engine crankcase, an oily sump for the engine, the mounting flange for the engine, the cage for the rope-starter mechanism, and other parts; and FIGURE 7 is a perspective view of the underside of the cover casting, the top side of which is illustrated in FIGURE 6, this view also showing the rope-starter mechanism in place and having portions thereof broken away and in section.

Referring now more particularly to the accompanying drawings, in which like numerals indicate like parts throughout the several views, the numeral 6 designates generally the chassis of a power lawn mower of the rotary type, which, as is customary, comprises an inverted dish-shaped housing having a flat top wall providing a deck 7 and a depending skirt 8. Wheels 9 portably support the chassis and a handle 10, only part of which is shown, extends rearwardly from the chassis to enable the operator to control and move the mower over the ground.

The cutting of the grass is done by a blade 11 which revolves about a vertical axis, with the blade travelling in a horizontal plane spaced a definite distance below the underside of the chassis deck. The actual cutting portions 12 of the blade are at its outer extremities and, as is customary in mowers of this type, the chassis has a discharge opening 13 through its skirt at one side of the mower, through which the grass clippings are ejected.

The cutter blade is driven by an engine, indicated generally by the numeral 14, which is mounted on the chassis deck 7 with the power take-off end portion of its crankshaft projecting downwardly through the chassis to drive the cutter blade.

The structure thus far described, follows standard practice. The invention differs from this standard practice in a new and novel orientation of certain essential elements of the engine, and especially the starting mechanism thereof.

Much of the basic engine is the same as that of the Lechtenberg Patent No. 2,693,789. Hence, it comprises a unitary cylinder crankcase casting 15, the cylinder portion 16 of which has the usual heat radiating fins, and the crankcase portion of which provides all walls of the crankcase except one—namely, that wall of the crankcase through which the power take-off end 17 of the crankshaft 18 projects. Accordingly, considering the engine mounted with its crankshaft vertical, the cylinder crankcase casting 15 provides the top wall 19 of the crankcase in which the top crankshaft bearing (not shown) is located, the end and side walls of the crankcase, and the cylinder.

The bottom wall of the crankcase is provided by a cover casting, indicated generally by the numeral 20. This cover casting is removably secured to the cylinder-crankcase casting to close the open bottom thereof. It serves many purposes, as will be hereinafter described, including the provision of a bearing 21 in which the power takeoff end portion 17 of the crankshaft is journalled. It also provides an oil sump 22 having a bottom wall 23 and a side wall 24 which terminates in a finished surface 25 adapted to mate with and be clamped against a correspondingly shaped finished surface on the cylinder crankcase casting with a gasket interposed therebetween.

The bearing 21 is formed in a boss which rises from the bottom wall 23 of the sump to an elevation above the normal oil level in the sump; and, in the same fashion, a bearing 26 is formed in a boss projecting from the bottom wall 23 to mount the adjacent end of the cam shaft (not shown). Oil is supplied to the sump through a filler port 27, which is normally closed by a removable plug 28.

A mounting flange 29 formed as an integral part of the cover casting 20 projects laterally therefrom. On the underside of this flange are three pads 30 which have downwardly facing surfaces lying in a common plane normal to the crankshaft axis. These pads seat upon and are bolted to the chassis deck 7, and thus mount the engine firmly thereon with approximately one-half of the cover casting 20 and, of course, all of the rest of the engine, located above the chassis deck and with the other lower half of the cover casting and the downwardly projecting power takeoff end portion 17 of the crankshaft below the chassis deck.

To enable the engine to be mounted in this fashion, the chassis deck has a hole 31 substantially in its medial portion, large enough to permit all those portions of the engine which lie beneath the plane of the mounting pads 30 to pass therethrough.

Since a rather substantial distance (on the order of three inches) should be maintained between the underside of the mower deck and the cutter blade for the mower to operate efficiently, and since engines heretofore used to power lawn mowers had no part thereof, other than the bottom crankshaft bearing which seldom projects very far below the mounting flange, a considerable portion of the total length of the crankshaft was devoted solely to spanning this distance between the deck and the cutter blade. Accordingly, the overall height of the engine, and particularly the height thereof above the mower chassis deck, was greater than would be the case if essential parts of the engine could be located in this space below the deck. Merely raising the mounting flange on the engine is out of the question, since it is already as close as possible to the engine cylinder.

The present invention accomplishes the desired result by the unprecedented placement of the combined flywheel and air impeller 32, the magneto designated generally by the numeral 33, and the starter mechanism, designated generally by the numeral 34, at the power takeoff side of the engine and, hence in the heretofore wasted space below the deck of the mower chassis.

However, important as this space saving feature of the invention may be, the described placement of the combined flywheel and air impeller, the magneto and the starter mechanism, has a much more significant and important consequence. Because these necessary elements of the engine are all located at that side of the engine which faces downwardly in the use of the engine on a rotary lawnmower, there is nothing at the top side of the engine to hinder the designer in applying whatever design treatment may be chosen to either blend the engine into the design of the mower or completely cover the engine.

Figure 3:
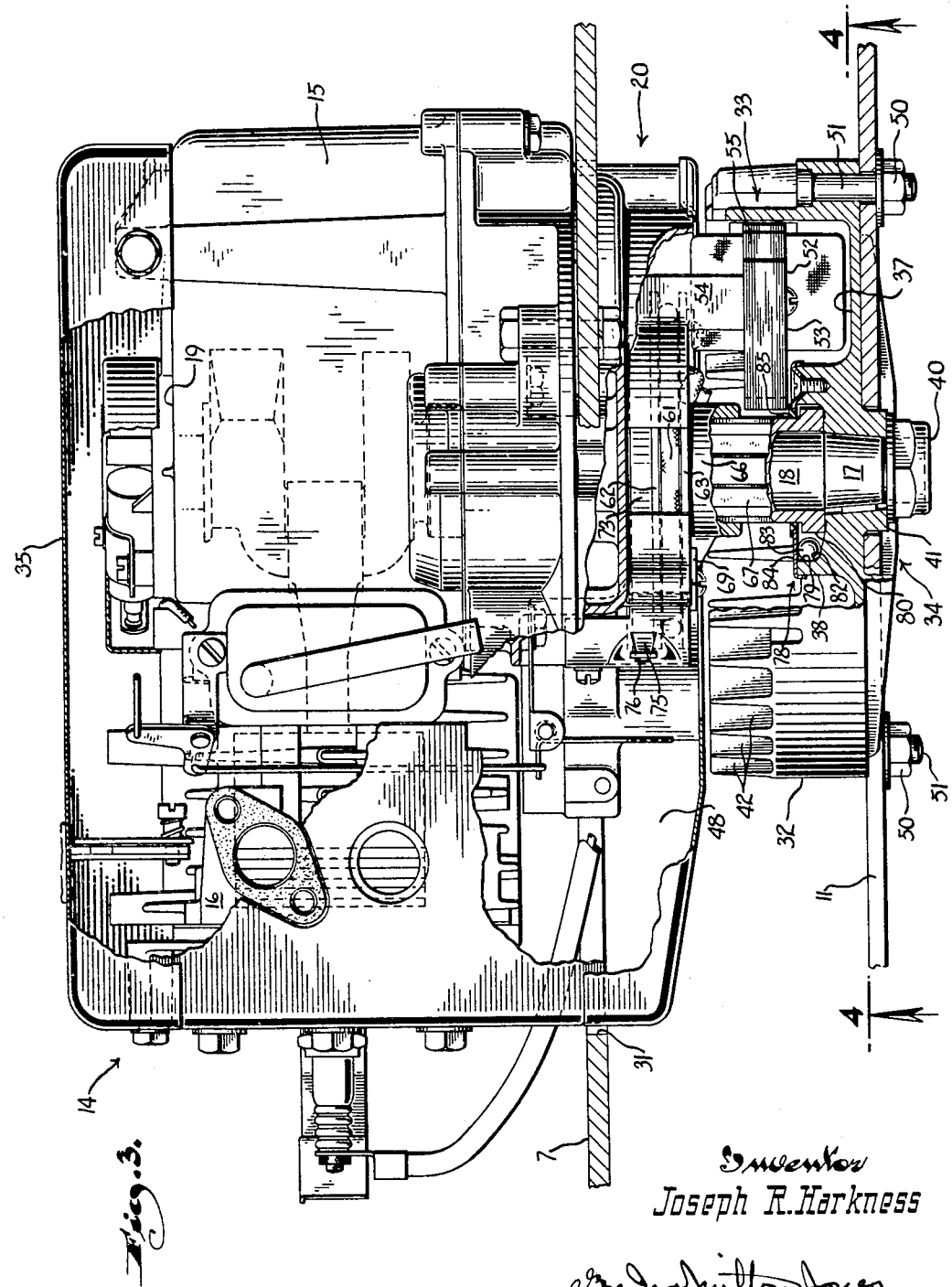
FIGURE 3 is a front view of the engine with parts broken away and in section, to better illustrate different structural features thereof, and showing particularly the location of the rope starter mechanism below the deck of the mower.

Thus, for instance, any simple cover such as that indicated by the numeral 35, and shown particularly in FIGURES 1, 2 and 3, could be used to cover the top of the engine.

The air impeller, as is customary, is an integral part of the flywheel, hence, these parts—as already indicated—are herein identified as a combined flywheel and air impeller, designated generally by the numeral 32. In its preferred embodiment, the air impeller is of the centrifugal type, wherein the air is taken in axially and discharged radially. Accordingly, the flywheel portion of the unit has an imperforate web 37 connecting its hub 38 with its rim 39, the hub being keyed to the lowermost portion of the power takeoff end 17 of the crankshaft to which it is held by a nut 40.

The outer or lower face of the flywheel preferably is planar except for a short downwardly projecting hub portion 41, against which the clamping nut 40 bears. The main part of the hub and the rim of the flywheel project from the opposite face of the web toward the adjacent wall of the engine.

The air impeller, being of the centrifugal type, consists of vanes 42 formed integrally with the rim 39 and projecting axially from the extremity thereof toward the adjacent wall of the engine, or, in other words, upwardly, and although the vanes 42 actually project from the rim 39, as shown and described, in a broad sense they may be considered as projecting from the web 37.

The vaned rim of the combined flywheel and air impeller has its inner edge directly adjacent to the edge of the discharge end of an air directing duct 48 which embraces the hot parts of the engine, so that the only outlet for the air moving downwardly through this duct and over the hot engine parts is through the spaces between the impeller vanes.

The cutter element 11, as already indicated, is secured directly to the underside of the combined flywheel and air impeller. It extends diametrically across the bottom of this unit and is held in place thereon by clamping nuts 50 threaded onto studs 51 which project downwardly from the lower face of the flywheel and pass through appropriately located holes in the cutter blade.

The magneto, indicated generally by the numeral 33, is of conventional design and construction, except for the location of its magnetic parts, and particularly its armature 52.

Figure 4:
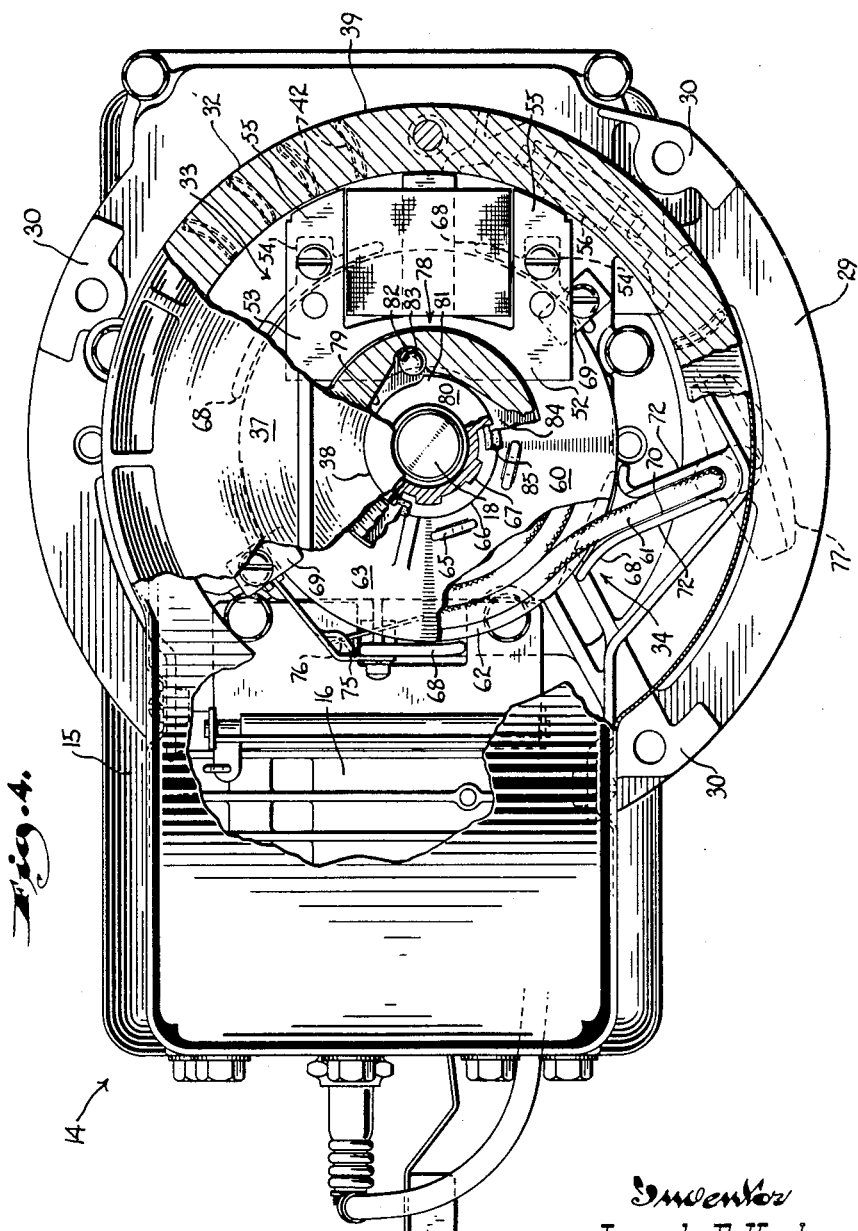
FIGURE 4 is a bottom view of the engine taken substantially on the plane of the line 4—4 in FIGURE 3, but with parts broken away and in section.
Figure 5:
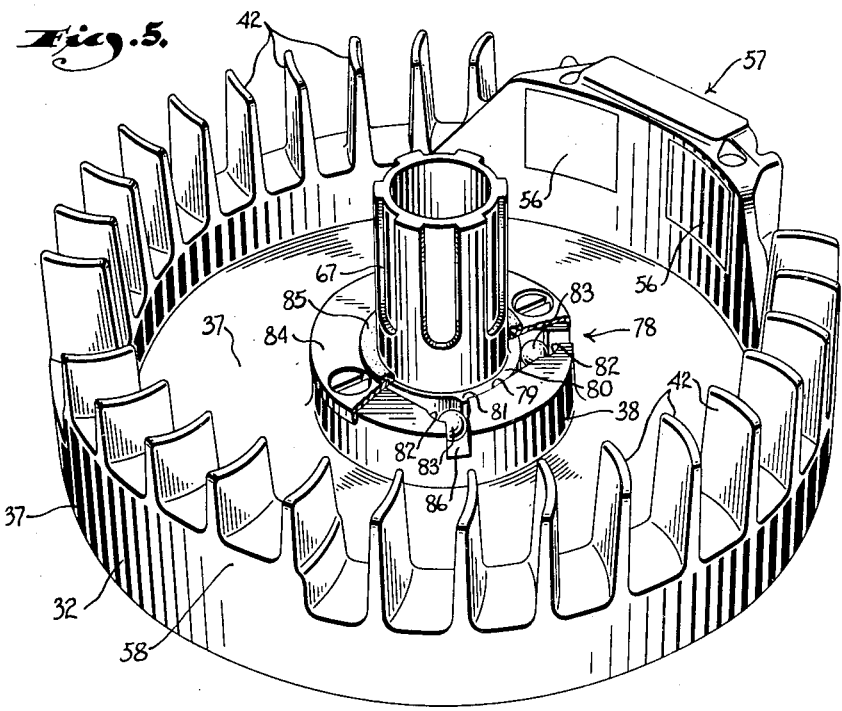
FIGURE 5 is a perspective view of the combined flywheel and air impeller, showing a part of the starter mechanism in place thereon.

As best shown in FIGURES 3 and 4, the magneto armature 52 is located in the cup-shaped housing formed by the combined flywheel and air impeller, the bottom of which housing is the web of the flywheel, and the side wall of which is its vaned rim. The armature is mounted in this location by having its magnetic core or frame 53 secured to a pair of bosses or lugs 54 which project down from the engine crankcase cover casting 20 (see FIGURE 7). The poles 55 of the armature core face outwardly toward the vaned rim of the flywheel to be swept by the poles 56 of the rotating magnetic parts of the magneto. These parts of the magneto are embedded in the rim of the flywheel with the poles 56 in an unvaned boss portion 57 and the faces thereof exposed on the inner surface of this boss. For balancing purposes, the vaned rim has an enlargement 58 diametrically opposite the boss 57.

The rope starter mechanism, indicated generally by the numeral 34, is located in the space between the flywheel-air impeller unit and the underside of the engine cover casting 20. It comprises a reel 60 upon which the starter rope 61 is wound, and ratchet means providing a unidirectional driving connection between the reel and the flywheel-air impeller unit. The reel has a pair of upper and lower flanges 62 and 63 between which the rope convolutions are confined, with one end of the rope secured to the reel, as at 64. The two flanges are spaced apart a distance generally corresponding to the diameter of the rope and are connected together in any suitable way, as by tangs 65 on the upper flange extending downwardly through the lower flange and riveted thereover, as shown in FIGURE 7.

The lower flange 63 has a hub 66 extending downwardly therefrom and slidably splined to a hollow shaft 67 which is freely rotatably mounted upon the adjacent portion of the crankshaft. Hence, the rotary driving element of the starter mechanism, comprising the rope reel, the hub 66, and the hollow shaft 67 are journalled for rotation in unison about the axis of the crankshaft and are located between the underside of the mower deck and the cutter blade.

To assure against displacement of the rope from the reel, the cover casting has a plurality of curved wall portions 68 projecting downwardly from its underside and embracing the rope reel, as best shown in FIGURE 7. Preferably, these curved wall portions are integrally connected with the bosses 54 upon which the magneto frame is secured.

A pair of fingers 69, removably secured to the underside of the cover casting, underlie the lower flange 63 to support the rope reel and thus hold the same in position in the cage defined by the curved wall portions 68.

The free end of the rope is slidably received in a rope guiding passageway 70 which leads from a point directly adjacent to the rope reel, to the top side of the engine mounting flange and hence the top side of the mower deck, where it terminates in a mouth 71. The passageway 70 is formed conjointly by a hole through the mounting flange and curved downwardly projecting wall portions 72 which also coact with the curved wall portions 68 in defining the rope cage.

A spiral spring 73 in the space between the underside of the cover casting and the rope reel provides the rewind bias for the starter. The inner end 74 of this spring is connected to the reel in any suitable manner, and its outer end 75 is anchored to the cover casting, as at 76.

A handle 77 on the free end of the rope provides the means by which a manual pull may be applied to the starter rope and, of course, also keeps the rope from being pulled down below the mounting flange.

Starting torque applied to the rope reel by a pull on the rope is transmitted to the engine crankshaft through a ratchet mechanism, indicated generally by the numeral 78. This ratchet mechanism is housed in a counterbore 79, formed in the hub 38 of the combined flywheel and air impeller, and comprises a flange 80 on the lower end of the hollow shaft 67 seated in the counterbore 79 and provided with a radial projection 81, a plurality of tangentially disposed cavities 82 in the side wall of the counterbore, and a plurality of balls 83, confined in said cavities to coact with the projection 81 on the flange. The balls 83 are held in their respective cavities by a cover 84 secured to the end of the hub and preferably provided with a dirt seal 85 around its inner edge to keep the ratchet mechanism as clean as possible. Any dirt that passes the seal 85 is expelled from the cavities, during rotation of the flywheel, through radial discharge ports 86 leading from the bottoms of the ball cavities.

In the analogy of the structure described to a conventional pawl and ratchet type of unidirectional drive connection, the balls 83 are the equivalent of the pawl or pawls, the recesses or cavities 82 in the side wall of the counterbore of the hub constitute the pawl anchors, and the radial projection 81 on the flange 80 of the hollow shaft is the equivalent of a single tooth to be engaged by any one of the pawls.

As noted hereinbefore, the rope reel and its associated mechanism is supported by the fingers 69, and since its hub is slidably splined to the hollow shaft 67, it follows that the weight of the reel is not supported by the hollow shaft 67, and because the hollow shaft alone is not very heavy, no special end thrust bearing means is necessary between the hollow shaft and the bottom of the counterbore in which it seats. Also, by virtue of the splined driving connection between the hollow shaft 67 and the hub of the rope reel, inevitable discrepancies in location between these parts encountered during assembly will be accommodated.

The construction and location of the rope starter mechanism has two very important advantages. First, it conserves space since by its described location it is placed in space otherwise wasted and, secondly, it assures against tipping over the mower during the starting of the engine. This follows from the fact that the point at which the starter rope enters the mower structure is close to the bottom thereof rather than at the very top as it is in conventional rotary lawn mowers. It should also be observed that, by having the starter rope come up through the engine mounting flange, the pull applied to the rope to start the engine is in a much more natural direction than in the prior art constructions.

Where the engine is fully covered, the starter rope, of course, should project all the way through the hood.

From the foregoing description, taken in connection with the accompanying drawings, it will be readily apparent to those skilled in this art, that this invention provides a greatly improved manner of starting the engine of a rotary type lawnmower, and in so doing eliminates one of the hazards associated with the starting of lawnmower engines of the past, wherein the starting mechanism was located at the top of the engine.

What is claimed as my invention is:

1. In a rotary power lawn mower, the combination of: a wheeled chassis having a substantially horizontal deck with a hole therethrough; an internal combustion engine mounted on the deck with its crankshaft vertical and the lower end portion thereof projecting down through said hole in the deck; a cutter blade driven from the lower end portion of the crankshaft and mounted to rotate in a horizontal plane spaced beneath the deck; and means including a unidirectional clutch for imparting engine-starting torque to the crankshaft without imposing objectionable tilting forces upon the mower chassis, comprising a rotary driving element coaxial with the crankshaft and located in the space between the underside of the mower deck and the cutter blade, and which driving element must be rotated in one direction in order to effect application of engine-starting torque to the crankshaft; and a motion-transmitting element connected to said rotary driving element and through which rotation may be imparted to the same in said direction from a remote point.

2. In a rotary power lawn mower, the combination of: a wheeled chassis having a substantially horizontal deck with a hole therethrough, an internal combustion engine mounted on the deck with its crankshaft vertical and the lower end portion thereof projecting down through said hole in the deck; a cutter blade fixed to the lower end portion of the crankshaft in spaced relation to the underside of the deck; a rotary driving element coaxial with the crankshaft and located in the space between the underside of the mower deck and the cutter blade; means connecting the rotary driving element with the crankshaft and through which rotation of the rotary driving element applies engine-starting torque to the crankshaft; and a flexible motion-transmitting element connected to said rotary driving element and through which rotation may be imparted to the same from a point remote therefrom.

3. In a rotary power lawnmower, the combination of: a wheeled chassis having a substantially horizontal deck with a hole therethrough; an internal combustion engine mounted on the deck with its crankshaft vertical and the lower end portion thereof projecting down through said hole in the deck; a cutter blade fixed to the lower end portion of the crankshaft in spaced relation to the underside of the deck; a rotary driving element coaxial with the crankshaft and located in the space between the underside of the mower deck and the cutter blade; an overrunning unidirectional clutch connected between the rotary driving element and the crankshaft through which engine starting torque may be applied to the crankshaft by rotation of the rotary driving element in one direction; and a flexible motion-transmitting element connected to said rotary driving element and through which rotation may be imparted to the same in said direction from a remote point.

4. In a rotary power lawnmower, the combination of: a wheeled chassis having a substantially horizontal deck; an internal combustion engine mounted on the deck with its crankshaft vertical and the lower end portion thereof projecting down through a hole in the deck; a cutter blade fixed to the lower end portion of the crankshaft in spaced relation to the underside of the deck; a rewind-type rope starter mechanism for the engine including a rope reel coaxial with the crankshaft in the space between the underside of the mower deck and the cutter blade, and a rewind spring connected with the reel and imparting torque thereto in one direction; an overrunning unidirectional clutch connected between the rope reel and the crankshaft and through which engine starting torque may be applied to the crankshaft by rotation of the rope reel in the direction opposite to that in which said rewind spring imparts torque to the reel; and a rope having one end thereof attached to the reel so that rotation of the reel in response to the torque applied thereto by the rewind spring winds part of the rope onto the reel, the rope providing means through which engine-starting torque may be applied to the reel from a point remote therefrom.

5. The combination of claim 4, further characterized by means providing a rope-guiding passageway leading from a point below the mower deck to a point thereabove, the rope being slidably received in said passageway and having its free end above the chassis deck so that an engine-starting pull may be applied to the rope in an upward direction from above the mower chassis.

6. In an internal combustion engine of the type adapted to operate with its crankshaft vertical with the lower end portion of the crankshaft projecting downwardly from the underside of the engine when the engine is in its position of normal use: a flywheel fixed to said lower end portion of the crankshaft in spaced relation to the underside of the engine; a rewind-type rope starter mechanism for the engine including a reel with a rope wound thereon, said starter mechanism being located in the space between the underside of the engine and the flywheel; an outwardly projecting mounting flange for the engine fixed with respect to the crankcase and lying generally in a plane normal to the crankshaft axis; and means defining a rope guiding passageway leading from a point adjacent to the reel of the starter mechanism and through said mounting flange, the starter rope being slidably received in said passageway and projecting from the mouth thereof to be readily accessible for the application of a pull thereon from above the mounting flange.

7. In an internal combustion engine of the type adapted to operate with its crankshaft vertical, said engine having the lower end portion of the crankshaft projecting downwardly from the underside of the engine when the engine is in its position of normal use: a flywheel fixed to said lower end portion of the crankshaft in spaced relation to the underside of the engine, the fly wheel having a hub with an upwardly opening counterbore; an automatic rewind type rope starter mechanism for the engine, including a reel with a rope wound thereon, and a hollow shaft freely rotatably mounted to turn about the crankshaft axis, said hollow shaft being connected with the reel to turn in unison therewith and having a part thereof received in the counterbore in the flywheel hub; cooperating uni-directional clutch means on the hub of the flywheel and said part of the hollow shaft which is received in the counterbore; a mounting flange for the engine fixed with respect to its crankcase and having a downwardly facing supporting surface lying in a plane normal to the crankshaft axis and disposed a short distance above the flywheel; and means defining a rope guiding passageway leading from a point adjacent to the reel and through said mounting flange, the starter rope being slidably received in said passageway and projecting from the mouth thereof to be readily accessible for the application of a pull thereon from above the mounting flange.

8. In an air-cooled single cylinder internal combustion engine having a crankcase and a cover casting closing one side of the crankcase and having a bearing in which the crankshaft is journalled with an end portion of the crankshaft projecting through and beyond said cover casting; a flywheel fixed to the projecting end portion of the crankshaft in spaced relation to the adjacent wall of the cover casting, the flywheel having a hub with a counterbore therein opening toward the cover casting; an automatic rewind-type rope starter mechanism for the engine including a driving element freely rotatably mounted for rotation about the axis of the crankshaft with one end portion of the driving element received in said counterbore in the flywheel hub, and a reel at its other end adjacent to the cover casting; uni-directional clutch means mounting in the counterbore of the flywheel hub for drivingly connecting the driving element of the starter mechanism to the flywheel; a rope wound on the reel; and means on the cover casting forming a rope guiding passageway leading from a point adjacent to the rope reel to a mouth alongside the crankcase, the starter rope being slidably received in said passageway and projecting from the mouth thereof to enable the application of a pull on the rope.

9. The engine of claim 8, wherein the cover casting has a mounting flange for the engine formed integrally therewith, said mounting flange having a supporting surface at one side thereof which lies in a plane normal to the crankshaft axis and faces the flywheel and the starter mechanism; and wherein the rope guiding passageway leads to the other side of the mounting flange with the mouth thereof opening at said other side of the mounting flange.

10. The engine of claim 9, further characterized by the fact that said cover casting has means cast integrally therewith forming a cage for the rope reel.

References Cited in the file of this patent
UNITED STATES PATENTS

| | | |
|---|---|---|
| 2,557,598 | Doggett | June 19, 1951 |
| 2,723,572 | Bornzin | Nov. 15, 1955 |
| 2,741,235 | Vieceli | Apr. 10, 1956 |
| 2,791,078 | Kiekhaefer | May 7, 1957 |